May 6, 1952 F. T. REDMAN, JR 2,595,539
VALVELESS VACUUM-OPERATED FLUID CIRCULATING
DEVICE FOR CLEANING HOLLOW OBJECTS SUCH AS
TEAT CUPS AND MILK TUBES.
Filed April 17, 1948 2 SHEETS—SHEET 1

INVENTOR
Franklin T. Redman, Jr.
BY *Gerald B. Tjoflat*
*His* ATTORNEY

May 6, 1952   F. T. REDMAN, JR   2,595,539
VALVELESS VACUUM-OPERATED FLUID CIRCULATING
DEVICE FOR CLEANING HOLLOW OBJECTS SUCH AS
TEAT CUPS AND MILK TUBES
Filed April 17, 1948   2 SHEETS—SHEET 2

INVENTOR
Franklin T. Redman, Jr.
BY Gerald B. Tjoflat
His ATTORNEY

Patented May 6, 1952

2,595,539

UNITED STATES PATENT OFFICE 2,595,539

VALVELESS VACUUM-OPERATED FLUID CIRCULATING DEVICE FOR CLEANING HOLLOW OBJECTS SUCH AS TEAT CUPS AND MILK TUBES

Franklin T. Redman, Jr., Pitcairn, Pa., assignor to Hall Laboratories, Inc., Pittsburgh, Pa., a corporation of Pennsylvania Application April 17, 1948, Serial No. 21,716

8 Claims. (Cl. 134—56)

1

This invention relates to devices for effecting re-circulation of fluids and more particularly to devices that operate on suction or vacuum. More particularly, the invention relates to a device which may be coupled to the vacuum systems such, for example, as provided for milking machines, whereby teat cups and milk hose of milking machines may be cleaned by the circulation of a detergent solution through the cups and the milk hose, the circulation being effected without the employment of valves or other complicating elements in the device.

An object of this invention is to provide an automatic re-circulating device that is operable from the suction or vacuum of a vacuum system and is entirely automatic in its operation, and which does not require any valves or other moving parts.

Another object of the invention is to provide a device that is operable from the vacuum system of a milking machine installation, for example, to intermittently draw a detergent solution from a receptacle through the parts to be cleansed, and thence into the device from which the solution is intermittently returned to the receptacle, all without the employment of valves or other moving parts, to effect the desired results.

A further object of the invention is to provide a device of the character referred to, that shall include a vacuum chamber provided with an exhauster adapted for connection to a vacuum system, an intake pipe to which the parts to be cleansed may be connected, and through which the cleansing solution is drawn from a storage vessel through the parts to be cleansed into the vacuum chamber, and a discharge or return pipe leading from the chamber to the vessel, whereby when the solution level in the vessel falls below the inlet to the parts to be cleansed, air flows into the vacuum chamber to break the vacuum, causing the solution to discharge therefrom to the storage vessel. As soon as the inlet to the parts to be cleansed are covered with solution, the drawing of solution into the vacuum chamber through the parts to be cleansed is repeated.

A still further object of the invention is to provide the exhauster, of the device referred to in the next preceding paragraph, with means whereby the rate of evacuation of the vacuum chamber may be decreased with respect to the rate at which the vacuum chamber is voided of solution after the vacuum therein is broken.

Another object of the invention is to provide

2 a vacuum operated device of the character referred to above that is simple in construction and particularly suited to being maintained in a sanitary condition and easily and readily inspected.

Other objects of the invention will, in part, be apparent, and will, in part, be obvious from the following description taken in conjunction with the accompanying drawings in which.

Figure 2:
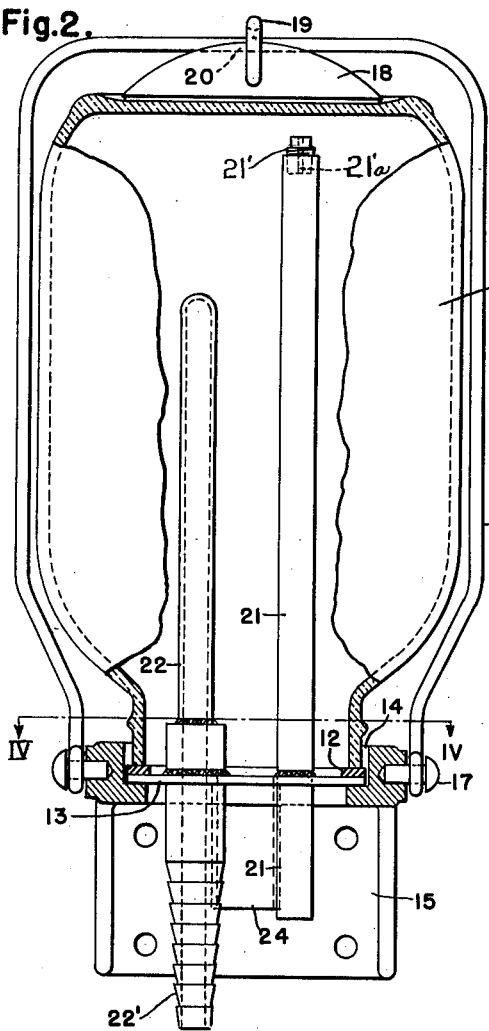
Fig. 2 is a view in front elevation, partly in section, of the circulating device shown in Fig. 1.
Figure 4:
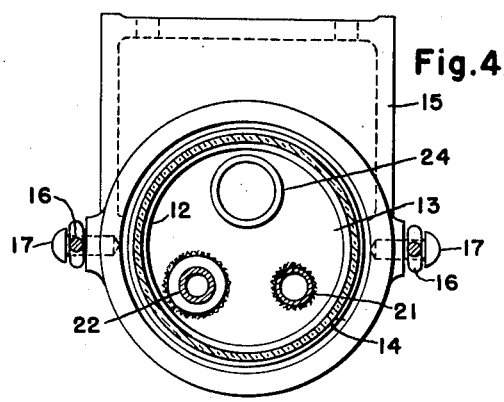
Figure 5:
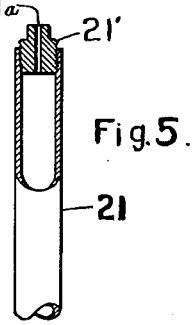

Fig. 4 is a view in section taken on line IV—IV of Fig. 2, the vacuum chamber of the device being omitted; and Fig. 5 is a fragmentary view, in section, of the upper portion of the exhauster pipe of the re-circulating device, the pipe being provided with a replaceable orifice for the regulation of the rate of evacuation of the vacuum chamber with respect to the rate at which the vacuum is destroyed by incoming air when the vacuum on the intake pipe is broken.

Throughout the drawings and the specification, like reference characters indicate like parts.

Figure 1:
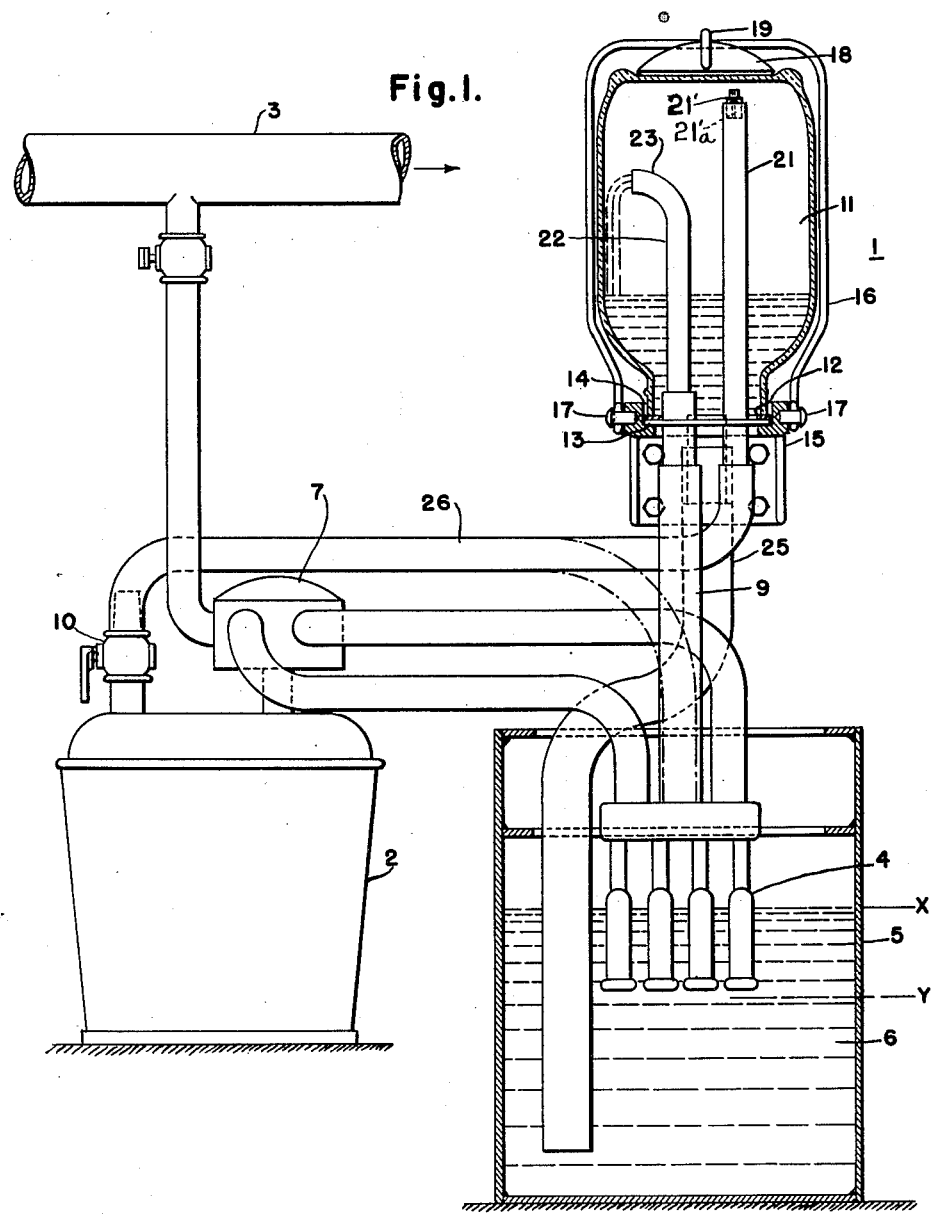
Figure 1 is a general organization view, partly in section, showing a vacuum line, a milking machine, and a fluid re-circulating device arranged and constructed in accordance with an embodiment of the invention, the view illustrating how the device is applied to the cleaning of the teat cups and milk hose.

In Fig. 1 of the drawings numeral 1 designates the vacuum operated re-circulating device arranged and constructed in accordance with what now appears to be a preferred form of the invention. The device is shown connected through a milk pail 2 to a vacuum line 3 and to teat cups 4 which are suspended in a container 5 having a quantity of detergent solution 6 therein.

The particular milking machine illustrated in the drawings is one in which the milk pail is provided with a pulsator 7 and whose function it is to alternately apply suction and atmospheric pressure to the space between the shell of the teat cups and rubber cups (not shown) within the same, all as is well understood in this art. The particular detail of construction of the teat cups and the pulsator being well known in this art, they need not be described or illustrated in detail. The milk hose for the teat cups is indicated by numeral 9.

If the teat cups are connected to the milk pail and the machine used for milking, milk hose 9 is connected to fitting 10 on milk pail 2.

Device 1 comprises a container or vacuum chamber 11 which is preferably made of glass, having its mouth at the bottom of the vessel and resting on a ring gasket 12. The mouth of chamber 11 is closed by a cover plate 13 which is nested within a socket 14 of a supporting bracket 15. The supporting bracket 15 is provided with a bail 16 which may be hinged to the supporting bracket by means of drive screws 17. The bail is of such length that it can be passed or looped over the top of the vacuum chamber or container 11.

The top of bail 16 carries a clamping pad 18 formed with a loop 19 that serves to retain the clamping pad on the bail. The clamping pad as shown is crowned, that is, it has a spherical or convex surface formed with a locking groove 20 at its uppermost point, so that when the bail is swung into place and sprung into the locking groove, pad 18 exerts sufficient pressure on vessel 11 to form a pressure tight joint between the mouth of the vessel, gasket 12, and cover plate 13. When a vacuum has been established in chamber or vessel 11, the atmospheric pressure acting on the exterior of the vessel will tend to hold it tightly on its gasket 12.

An exhauster or vacuum pipe 21 and an intake pipe 22 extend upwardly through the cover plate 13. It is preferred to form a bend 23 in the upper end of intake pipe 22 so that fluid issuing out of it will be directed against the wall of vessel 11 thereby preventing or minimizing the amount of carry over of solution vapor in the space near the top of the vessel into the exhauster pipe 21. Plate 13 is also provided with a drain pipe 24 that projects only a short distance above plate 13. The lower end of intake pipe 22 is preferably formed with a hose fitting 22' having steps or notches therein, the better to grip a hose that is attached thereto.

The inlet end of exhauster 21 is provided with a plug 21' having a small orifice or passageway 21'a therein. The plug conveniently is threaded into the end of the exhauster pipe so that it may be removed and replaced by a plug having a different size of orifice if that is necessary when used on a particular vacuum system.

Some vacuum systems, particularly those having large vacuum pump capacities, have so much vacuum or exhausting capacity compared to the volume of the space in container 11, that the vacuum might not be broken long enough therein to allow sufficient detergent solution to discharge therefrom before the vacuum is re-established to effect satisfactory washing of the parts to be cleansed. By utilizing an orifice plug 21 having a proper size of orifice or passageway 21'a, the exhausting of air through the exhauster may be delayed, thus allowing a greater volume of solution to be drawn into and discharged from the vacuum chamber 11. The size of orifice or passageway 21'a may vary. For the usual milking machine system, I have found that an orifice having a diameter of $\frac{3}{32}$" is satisfactory. The size of this orifice may vary over a range determined by the capacity of the vacuum pump of the system. In general, the larger the vacuum pump capacity, the smaller the orifice should be. For a system having a pump with sufficient capacity to operate say up to 4 milking machines, an orifice of about $\frac{2}{32}$" to $\frac{3}{32}$" in diameter is satisfactory when the capacity of chamber 11 is about one gallon.

In the operation of the device, the bottom of suction tube 21 is connected by a hose 26 to the milk valve fitting 10 on pail 2, the milk hose 9 is connected to hose fitting 22' and a hose 25 is connected to drain pipe 24. The open end of hose 25 is placed in pail or container 5 well down into the body of liquid or solution therein. The teat cups 4 are suspended in the container 5 at such a height with respect to the normal level of the solution that the open ends of these cups extend well down into the solution but at a distance above the lowermost end of tube 25.

When valve 10 is opened so as to connect hose 26 to the suction or vacuum of the vacuum line 3, air is withdrawn from vessel 11 through exhauster 21 causing solution to be sucked up through the teat cups, milk hose 9, and intake pipe 22 into chamber 11. The solution will continue to flow through pipe 22 until the level of the liquid in container 5 has been lowered to a point below the open ends of the teat cups, for example, to a level such as indicated at Y.

When the open ends of the teat cups are exposed, air flows up through these cups into container 11, destroys the vacuum or partial vacuum therein and establishes a pressure within it which is substantially atmospheric. When this occurs, the solution which has accumulated in vessel 11 will discharge through drain pipe 24 and hose 25 into container 5. It will continue to discharge until the level of the fluid or solution in the container is above the open ends of the teat cups, and when the solution level has become sufficiently high, solution again will flow through the teat cups into vessel 11, and the above described operation will be repeated. The above described operation will continue indefinitely until the vacuum is disconnected from chamber 11 by closing valve 10.

The orifice in plug 21'a regulates the time required to re-establish the vacuum in chamber 11 to a value sufficient to effect flow of solution from vessel 5 into chamber 11. Until this degree of vacuum has been established, the solution will continue to flow into vessel 5. Thus, it is apparent the size of the orifice 21'a will determine the height or level of liquid above the open end of the teat cups once the device is in operation.

I have found that the recirculating device appears to function more efficiently when the inside diameters of the drain pipe 24 and hose 25 are larger than the inside diameters of the intake pipe 22 and the passageway of the milk hose 9. Thus in Fig. 4, the diameter of drain pipe 25 is shown to be larger than that of the intake pipe 22. The diameter of suction pipe 21 is shown as being the same as that of pipe 22, but it is not essential that the diameters of these pipes be equal.

While I have shown the teat cups and the circulating device connected to a milk pail and to a vacuum system, it is not essential that this be done. For example, tube 26 could be connected directly to the vacuum line 3 and the milk tube or hose 9 connected to pipe 22 as shown in the drawing. When so connected, the device would operate as described above.

It is preferred, however, to connect the device as shown in Fig. 1, because if any solution is carried over as vapor into pipe 21, that solution would be collected in the milk pail and not be drawn into the vacuum system. In other words, the pail acts as a trap.

The connections as shown in Fig. 1 to the type of milking machine therein disclosed is preferred also because all that need be done to clean the teat cups and the milk hose is to disconnect the milk hose 9 from valve 10 and reconnect it to pipe 22, and then connect pipe 21 to valve 10 by an extra hose which is provided for the purpose, viz., hose 26.

Figure 3:
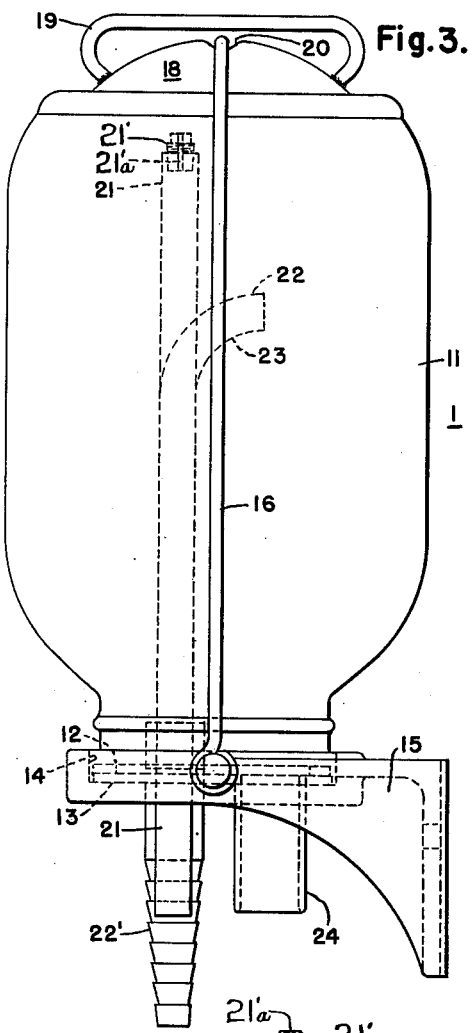
Fig. 3 is a view in side elevation of the circulating device.

In Figs. 2, 3, and 4, the constrution of the vacuum circulating device 1 is shown more in detail. The construction of the cover plate 13 and the arrangements of the tubes or pipes 21, 22, and 24 are particularly shown in these views.

The suction device illustrated may be mounted by means of its bracket 15 in a permanent position in a dairy where it may be readily inspected and readily taken apart for cleaning. Since the device has no valves or moving parts, it is easy to keep clean. The vacuum chamber or vessel may be made of glass, which also makes it easy to inspect the same for soil, and in addition cleaning and sterilizing thereof is facilitated.

The cover plate 13 and the tube assembly, viz., the tubes or pipes 21, 22, and 24 may be removed from the supporting bracket and thoroughly cleaned and sterilized whenever it is necessary without much trouble or inconvenience.

The circulating device illustrated herein is simple in construction, is ideally suited to being maintained in a sanitary condition, is readily inspectable, and contains only few simple parts.

The device is fully automatic and once put in operation will continue to operate without attention as there are no valves in the device to manipulate.

From the foregoing description and the drawings accompanying the specification, it will be apparent to those skilled in the art that various modifications and changes may be made in the details and arrangements of parts without departing either from the spirit or the scope of the invention. Therefore, what I claim and desire to secure by Letters Patent is:

1. A device for recirculating solutions comprising a pressure tight container having an exhauster pipe extending into the same to which suction is continuously applied while the device is in operation, an intake pipe extending into said container and terminating therein at a level below the terminal level of said exhauster pipe but above the level to which liquid rises in said container, said intake pipe being adapted to conduct a solution in response to suction applied to said exhauster pipe and discharge the same into said container, a tube having one end connected to said intake pipe, the other end thereof being open, a drain outlet for said container, and a tube having one end connected to said drain outlet, the other end being open, said device when mounted at an elevation such that the drain and intake tubes hang free with the open ends thereof immersed in a body of solution whose volume is approximately that of the pressure-tight chamber, and with the open end of the drain tube below the open end of the intake pipe tube, and suction is applied to said exhauster pipe, causing solution to flow up said tube and intake pipe into said container until the solution level of said body falls below the open end of the intake pipe tube in response to which air enters said container and breaks the vacuum therein, whereupon solution in said container discharges through the drain tube into said body of solution, and when the level of said body rises above the open end of said intake pipe tube, the solution is again drawn into said container only to return to the solution body when the vacuum in the container is broken as aforesaid.

2. A recirculating unit according to claim 1 characterized by the fact that said unit comprises a container having an open bottom, a cover plate for said open bottom, a support bracket having an annular flange for receiving said cover plate, the exhauster, drain, and intake pipes extending through said plate and being formed as a unitary assembly therewith, a gasket between the open end of said vessel and said plate, and a clamping bail pivotally mounted on said bracket and being arranged to loop over the upper end of said vessel and clamp the open end thereof tightly on said gasket at its open end.

3. A recirculating unit according to claim 1 characterized by the fact that said unit comprises a vessel having an open bottom, a support bracket having an annular flange for receiving a cover plate for the open end of said vessel, the exhauster, drain, and intake pipes extending through said plate and being formed as a unitary assembly therewith, the diameter of the drain pipe being larger than the diameter of the intake pipe, a gasket between the open end of said vessel and said plate, and a clamping bail pivotally mounted on said bracket and being arranged to loop over the upper end of said vessel and clamp the same tightly on said gasket at its open end.

4. A unit according to claim 1 characterized by the fact that the exhauster pipe is provided with an orifice for retarding the rate of evacuation of said container with respect to the rate at which solution discharges therefrom in response to the breaking of vacuum therein.

5. The combination of a receptacle having a quantity of liquid therein, with a device for effecting circulation of said solution through hollow objects to be cleansed and returning the solution to said receptacle for recirculation through said objects, said device comprising a pressure tight container mounted at an elevation higher than the solution receptacle, the volume of said container being approximately equal to the volume of said liquid, an exhauster pipe extending into said container and having its open end terminating near the top thereof, an intake pipe extending into said container, a hollow object to be cleansed having one end connected to said intake pipe and its other end submerged in the solution in said receptacle, a drain pipe for said container, and a tube having one end connected to said drain pipe and its other end submerged in the solution of said receptacle to a greater depth than the submerged end of said hollow object, said combination being characterized in operation by the fact that vacuum in said container causes solution to flow from the receptacle through the hollow object into said container until the submerged end of said hollow object is exposed to atmosphere allowing air to enter the container whereupon the vacuum breaks and the solution therein returns through the drain tube to the receptacle until the end of the hollow object in the receptacle is again submerged at which time vacuum in the container again causes solution to flow through the hollow object into the same until the open end of said hollow object is again exposed to atmosphere and the solution is again returned to the receptacle and so on as long as the vacuum is maintained in the vessel and a sufficient quantity of solution is provided in the receptacle.

6. A combination according to claim 5 characterized by the fact that the exhauster pipe is provided with an orifice for retarding the evacuation of said container in relation to the rate at which solution discharges therefrom in response to the breaking of vacuum therein.

7. A combination according to claim 5 characterized by the fact that the diameter of the drain pipe is greater than the diameter of the intake pipe.

8. A combination according to claim 5 characterized by the fact that the respective diameters of the drain pipe and tube connected thereto are greater than the respective diameters of the intake pipe and the flow passage of said hollow object.

FRANKLIN T. REDMAN, Jr.

REFERENCES CITED

The following references are of record in the file of this patent:

UNITED STATES PATENTS

| Number | Name | Date |
|---|---|---|
| 1,244,552 | Shelor | Oct. 30, 1917 |
| 1,262,077 | Maurer | Apr. 9, 1918 |
| 1,627,824 | Beaty | May 10, 1927 |
| 1,645,356 | Shurts | Oct. 11, 1927 |
| 1,715,492 | Bassion | June 4, 1929 |
| 2,233,852 | Schmitt | Mar. 4, 1941 |